United States Patent [19]

Clark et al.

[11] Patent Number: 4,552,501

[45] Date of Patent: Nov. 12, 1985

[54] BIG BALE HANDLING SYSTEM

[76] Inventors: Raymond W. Clark, Rte. 1, Box 131, Hansen, Id. 83334; Rudolf Limpert, 280 Woodland Dr., Summit Park, Utah 84060

[21] Appl. No.: 532,574

[22] Filed: Sep. 14, 1983

Related U.S. Application Data

[63] Continuation-in-part of Ser. No. 418,241, Sep. 15, 1982, abandoned.

[51] Int. Cl.$^4$ ............................................. B60P 1/00
[52] U.S. Cl. .................................... 414/486; 414/555; 414/681; 294/86.41; 294/107; 280/754
[58] Field of Search ............... 414/491, 555, 486, 422, 414/681, 682, 736; 294/107, 86 LS, 103 CG, 88, 86.41; 280/754

[56] References Cited

U.S. PATENT DOCUMENTS

| | | | |
|---|---|---|---|
| 2,703,252 | 3/1955 | Blackwell | 294/86 LS |
| 2,821,318 | 1/1958 | Kendall | 294/86 LS |
| 2,882,086 | 4/1959 | Steinback | 294/86 LS |
| 3,373,882 | 3/1968 | Forest | 414/39 |
| 3,713,554 | 1/1973 | Thompson et al. | 414/422 X |
| 3,754,774 | 8/1973 | Nelson | 280/754 |
| 3,795,332 | 3/1974 | Eriksson | 414/539 |
| 3,796,331 | 3/1974 | Dutton | 414/555 X |
| 3,800,966 | 4/1974 | Newton | 414/555 X |
| 3,883,153 | 5/1975 | Singh et al. | 280/754 X |
| 4,005,894 | 2/1977 | Tucek | 294/88 |
| 4,012,069 | 3/1977 | Carson | 294/88 X |
| 4,017,114 | 4/1977 | LaBounty | 294/88 |
| 4,091,943 | 5/1978 | Bay-Schmith | 414/555 X |
| 4,373,856 | 2/1983 | Taylor | 414/470 |
| 4,375,936 | 3/1983 | Dechantsreiter | 294/103 CG X |
| 4,459,075 | 7/1984 | Eichenberger | 414/555 X |

FOREIGN PATENT DOCUMENTS

| | | | |
|---|---|---|---|
| 1011297 | 5/1977 | Canada | 414/24.5 |
| 1101976 | 3/1961 | Fed. Rep. of Germany | 280/754 |
| 54-18521 | 2/1979 | Japan . | |

OTHER PUBLICATIONS

"Round Baling Systems"-Advertising Literature of Sperry-New Holland Company.
"Self-Propelled Speed and Convenience Automates Round Bale Handling!"-Advertising Literature of Sperry-New Holland Company.
"Big Bale Roadsider", Advertising Literature of Freeman & Son, Inc.
"Roadsider Automatic Field Stacker,"-Advertising Literature of Freeman & Son, Inc.
"HIAB 650"-Advertising Literature of HIAB-FOCO.

Primary Examiner—Joseph E. Valenza
Assistant Examiner—David A. Bucci
Attorney, Agent, or Firm—Workman, Nydegger & Jensen

[57] ABSTRACT

A machine for lifting, rotating and transporting crops in the form of bales. The machine includes a motorized chassis with a cab for an operator. A tilt table is located on the back of the chassis for holding and unloading the bales. A boom is positioned adjacent the table on the chassis for loading bales onto the system or for transferring bales between locations. A fork is connected to the distal end of the boom for grabbing the bales and includes mechanism for rotating the bales about a vertical axis and a horizontal axis so that the bales can be aligned in any orientation for stacking.

7 Claims, 5 Drawing Figures

BIG BALE HANDLING SYSTEM

RELATED APPLICATIONS

The present application is a continuation-in-part of our copending patent application Ser. No. 418,241, filed Sept. 15, 1982 now abandoned, entitled "Big-Bale Handling System."

BACKGROUND

1. Field of the Invention

The present invention relates to systems for handling bales of crops and, in particular, is directed to a system for handling large bales of hay.

2. The Prior Art

In order to more easily transport and store grass-like foodstuffs for cattle and other animals, it has been found to be advantageous to press and secure the material into some type of bale. For example, hay is often pressed and tied into small rectangular bales which are about two feet square on each end and about three to four feet in length. These bales can then be stacked on a truck or trailer for transporting and can be stacked in large blocks for storage.

While this method provides a workable means for handling the hay, it has certain disadvantages when large amounts of hay have to be processed. The baler which forms the bales of hay generally tosses the bales back into the field in rows as they are formed. It is then necessary to follow behind with a truck or trailer to pick up and transport the bales. Under some circumstances, the bales are loaded by hand. However, this requires a significant amount of man power and is very time consuming. Accordingly, various systems have been developed to automatically pick up and stack the bales of hay onto a truck.

These automatic systems generally comprised a shoot or ramp which is directed at the bale and lifts it up so that it can be carried by a series of conveyors and stacked on the truck. In order for the automatic loaders to work most effectively, it is necessary that the bales be arranged in a uniform direction so that the loader can simply progress in a direct line down the field picking up the bales. This often means that a person must proceed the bale loading system through the field to straighten the bales so that they are in the correct alignment. Additionally, this bale loading system is time consuming when large numbers of bales are involved in large farming operations.

Because of the problems involved in forming and handling small bales, several systems have recently been developed which utilize much larger bales to facilitate the handling and transportation of the hay. A big baler can have an hourly capacity which is about two and one-half times that of a small baler. Additionally, a big baler handles the hay more softly, allowing more leaves to remain on the stems. Thus, cattle will eat both leaves and stems rather than pushing the stems aside to eat only the leaves.

One type of big bale which has been utilized is commonly referred to as a round bale and comprises a cylindrical shaped bale of hay about five feet long and about four feet in diameter. However, while it is easy to form these types of bales, they are much more difficult to transport and store. Cylindrical bales cannot easily be stacked into large blocks for storage.

Another method for forming large stacks of hay which has been utilized is to form the hay into large loaf-like stacks. However, these stacks can only be stacked singly for storage and are extremely difficult to transport.

In order to take advantage of both size and shape, balers have been developed which form the hay into large rectangular bales. Currently, there are two common rectangular baling systems which form big bales. One baler prepares a rectangular bale which is approximately 38 inches by 46 inches by 8 feet and is referred to as a "Freeman" bale. Another system produces a bale which is about 46 inches by 50 inches by 8 feet and is referred to as a "Hesston" bale. These large rectangular bales hold much more hay than the conventional small rectangular bales but can still be stacked on a truck or trailer for transporting and can be stacked in large blocks for storage.

While the large rectangular bales have provided a means for handling larger amounts of hay in fewer units, these big bales have still presented certain handling problems. Because of their size, these bales are much more difficult to lift and move. A Freeman bale weights approximately 1500 lbs. and a Hesston bale weighs approximately 2000 lbs. Thus, the bales cannot be picked up and stacked by an individual but must be loaded by some mechanical means. At the present time, a front end loader or forklift is often used in the field to lift the bales onto a truck so that they can be transported to the storage area. In the storage area, the forklift is again used to lift the big bales off the truck and to stack them in large blocks for storage. This method of handling the big bales requires the services of two operators, one for the truck and one for the loader. Additionally, it is necessary to drive the loader from the field back to the storage area with each load of hay to take the bales off the truck.

In order to eliminate the need of having to take the loader back to the storage area each time, trucks having tilt tables have been developed for transporting the hay. The hay is stacked on these tilt tables in the field utilizing a front end loader or forklift. The truck is then driven to the storage area where the table is tilted up on end by a series of hydraulic pistons. The back end of the table is provided with a series of forks which prevent the bales from falling off as the table is being tilted but which can easily slide out from under the bales once they are positioned upright. This system not only makes it possible to unload the truck in the storage area without the use of a forklift but also provides a much quicker means for unloading the bales of hay.

While these prior art systems provide means for transporting and stacking the large bales of hay, they do not solve all of the problems which are associated with the hay. For example, depending upon the weather conditions which are encountered, farmers have different preferences as to how they want to stack the various tiers of hay. When hay becomes wet it can easily and quickly become rotten so that it is no longer useful as feed. Thus, when stacking hay it is important to form the large blocks of hay such that they are protected to the greatest extent possible against the weather.

When bales of hay are formed, the stalks are generally all aligned in substantially the same direction. Thus, depending upon which way the bale is placed, the stalks are either horizontal or vertical with respect to the ground. When the stalks are vertical, rain and snow falling on the bales can easily penetrate down the lengths of the stalks and into the center of the bale where the moisture can cause the bale to rot. Accordingly, it is advantageous to position the upper layer of bales such that the stalks are horizontal to prevent precipitation from penetrating into the stack.

Additionally, the weather and the condition of the ground can have an effect as to how the bottom layer should be arranged. If the ground is extremely moist, the bottom bales should be placed such that the stalks are on an end to prevent the hay from absorbing ground moisture and rotting the bottom layer of the bale. If the ground is relatively dry it is preferable to stack the bales such that the stalks are horizontal to prevent precipitation from entering the bales when the upper levels are removed from the stack.

When a front end loader or forklift is used to unload and stack the bales of hay, it is extremely difficult to turn the bales to adjust the direction of the stalks. Thus, the orientation of the bales as they come off the baler in the field is generally the orientation that they have in the stack. On the other hand, when a tilt table is used to unload the bales, the orientation of the bales is rotated ninety degrees, but again there is little flexibility in adjusting the orientation.

Accordingly, what is needed in the art is a system for handling and transporting large bales of hay and the like which is simple and efficient to operate and which allows for versatility in the manner in which the bales are stacked and handled in the field and storage areas. Such a device is disclosed and claimed herein.

BRIEF SUMMARY AND OBJECTS OF THE INVENTION

The present invention is directed to a system designed to load, transport, and handle large bales of hay and other crops. The system includes a motorized chassis having a tilt bed attached thereto. The tilt bed is substantially similar to those used on conventional small bale loaders. A multi-section boom is positioned on the chassis forward of the tilt bed for lifting and handling the bales of hay.

A rotator assembly and hydraulic bale fork are connected to the distal end of the boom for grabbing and controlling the orientation of the bale. The rotator assembly includes a section which can rotate the bale about an axis perpendicular to the ground and a section which can rotate the bale ninety degrees about an axis parallel to the ground. This second section of the present invention is utilized to orient the bales of hay such that the stalks are aligned in the proper direction in the stack to protect the hay from the weather. The rotator assembly includes a pair of arched tracks along which a sled can travel. Once a bale has been secured by the grab fork, the sled can travel along the tracks in the rotator assembly so as to rotate the bale ninety degrees.

The present invention also includes a unique suspension locking system on the chassis to stabilize the system while the large bales are being lifted and maneuvered. The suspension locking mechanism includes a disc brake mechanism which is secured to the frame of the chassis. A locking bar is slidably positioned within the brake mechanism such that it can move up and down and is anchored to the axle by a bracket which encompasses the spring. Accordingly, when a large bale is being maneuvered, the brake mechanism can grab the locking bar so as to hold the frame and axle of the loading system in a fixed position with respect to each other.

It is, therefore, a primary object of the present invention to provide a big bale handling system which can be utilized to orient the bales in any direction as they are stacked.

It is a further object of the present invention to provide a big bale handling system which can be utilized to load, unload, and transport large bales.

It is another object of this invention to provide a big bale handling system which is easy and efficient to operate and which can be operated by one person.

It is still another object of this invention to provide a big bale handling system which has a simple and efficient suspension locking mechanism which is easy to operate yet provides the necessary rigidity to insure safe operation.

These and other objects and features of the present invention will become more fully apparent from the following description and appended claims taken in conjunction with the accompanying drawings.

DETAILED DESCRIPTION OF THE PREFERRED EMBODIMENT

The present invention is directed to a system for loading and transporting large bales of crops such as hay. While the system can be used on bales of diverse sizes, it is particularly adopted to handling Freeman bales (approximately 38 inches × 46 inches × 8 feet) and Hesston bales (approximately 50 inches × 46 inches × 8 feet). The system can be used to pick up bales in the field and transport them to a stack lot where they can be stored. The system can also be used to load bales onto trucks, to transfer bales from a stack to a truck, or to reload bales back onto the system. In order to more fully describe the present invention, reference is now made to the drawings in which like parts are designated with like numerals throughout.

Figure 1:
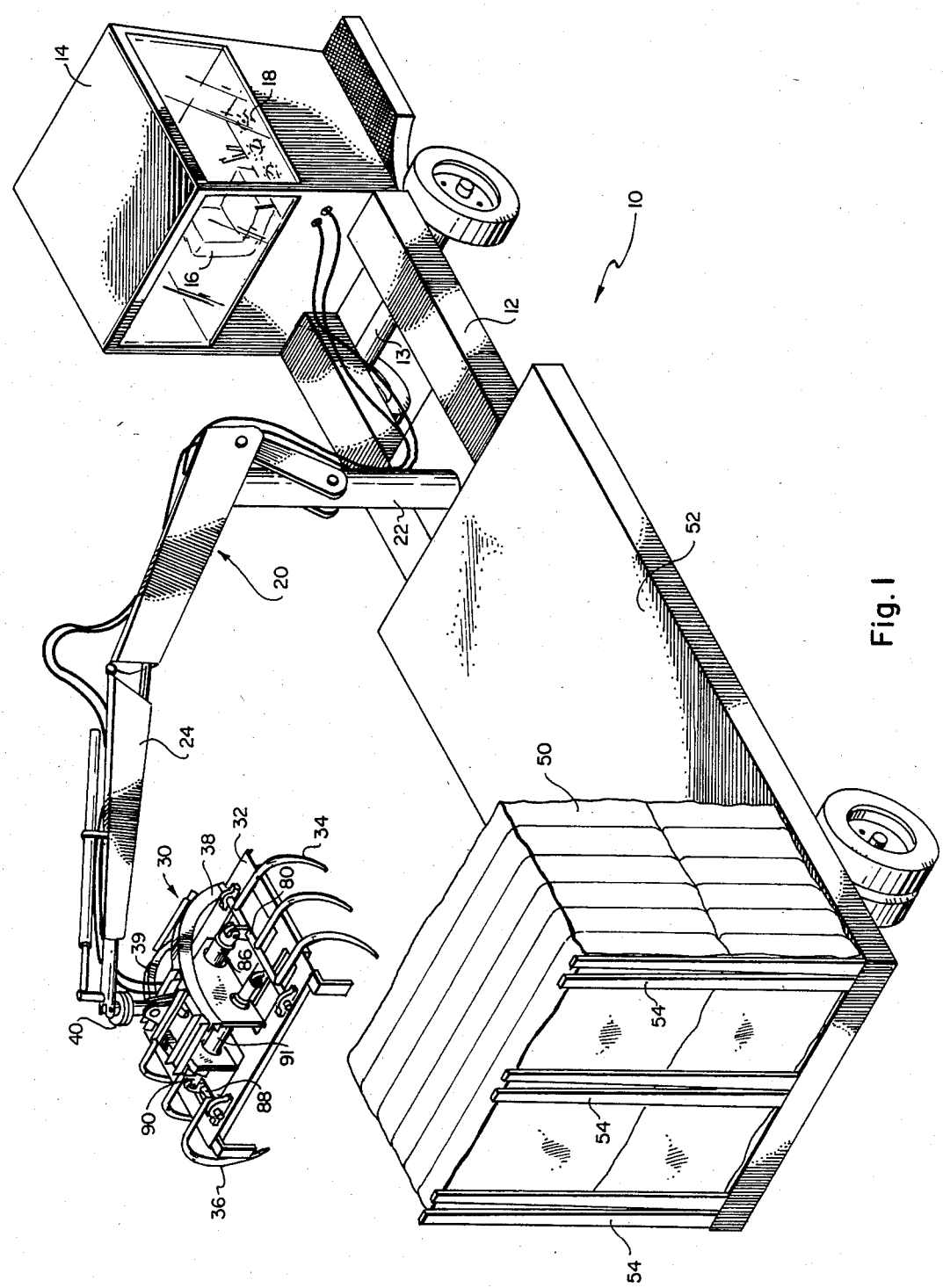
FIG. 1 is a perspective illustration of the big bale handling system of the present invention.

FIG. 1 is a perspective illustration of the present invention wherein the big bale handling system is generally designated at 10. System 10 includes a motorized chassis 12 which is used to transport the operator and the big bales. Chassis 12 includes a cab 14 where an operator can sit to control the system. A seat 16 is included in cab 14 and can face forward such that the operator can drive the system around the field and stack lot or can be turned such that it faces the loading side of the system when the operator is loading or unloading bales of hay.

A panel 18 having the controls to operate the loading system is positioned on the right side of cab 14. Accordingly, the operator who drives the system can also operate the loading mechanism from the cab. Thus, it is possible for a single operator to easily load and transport bales of hay or other crops with the present system rather than requiring the services of two individuals as is needed with many of the prior art systems.

A boom generally designated 20 is mounted on chassis 12 for lifting and maneuvering the big bales of hay 50 onto the system and can also be used to unload the bales or to transfer the bales between locations. Boom 20 includes a post 22 which is anchored to chassis 12 and a moveable arm 24. Numerous types of hydraulic booms are available commercially and can be used in the present invention.

A fork assembly, generally designated at 30, is attached to the distal end of boom 20 for grabbing and holding the bales 50. Fork assembly 30 includes a generally planar body 32 which is placed adjacent one side of a big bale. As more fully discussed hereinafter, a first set of hooks 34 and a second set of hooks 36 then penetrate the bale 50 to securely grasp it and hold it adjacent body 32 while the bale is being maneuvered.

Fork assembly 30 also includes means for rotating a bale such that it can be aligned in various positions for stacking. The rotating means includes a pair of curved tracks 38 and 39 which allow a bale to be rotated ninety degrees about a horizontal axis. Accordingly, bales can be aligned such that the stalks are positioned either horizontally or vertically in the stack depending upon the particular weather and ground conditions. The rotating means also includes a hydraulic rotator head 40 which allows the fork assembly to be rotated 300 degrees about a vertical axis. Thus, the fork assembly can grab a bale regardless of its orientation as it lies on the ground.

In the preferred embodiment, system 10 also includes a tilt table 52 which is positioned on the rear portion of chassis 12 to receive the bales of hay. Table 52 is designed to hold six Hesston bales or up to nine Freeman bales and is similar to the table used on the New-Holland Stack Cruiser. While boom 20 can be used to unload the bales of hay, tilt table 52 allows a full load to be unloaded in a stack lot much more quickly. A series of forks 54 extend upwardly from the rear edge of table 52. Forks 54 prevent bales 50 from falling off of the table 52 as the table is raised from a horizontal to a vertical position. When the table has been positioned in the upright position with forks 54 on the ground, forks 54 can be pulled out from under the stack of hay by using pushoff feet which move system 10 forward, thus leaving the bales in a stack. By using fork assembly 30 to orient the bales 50 on table 52, the bales can be arranged in various configurations in the stack lot to provide maximum protection against the weather.

Figure 2:
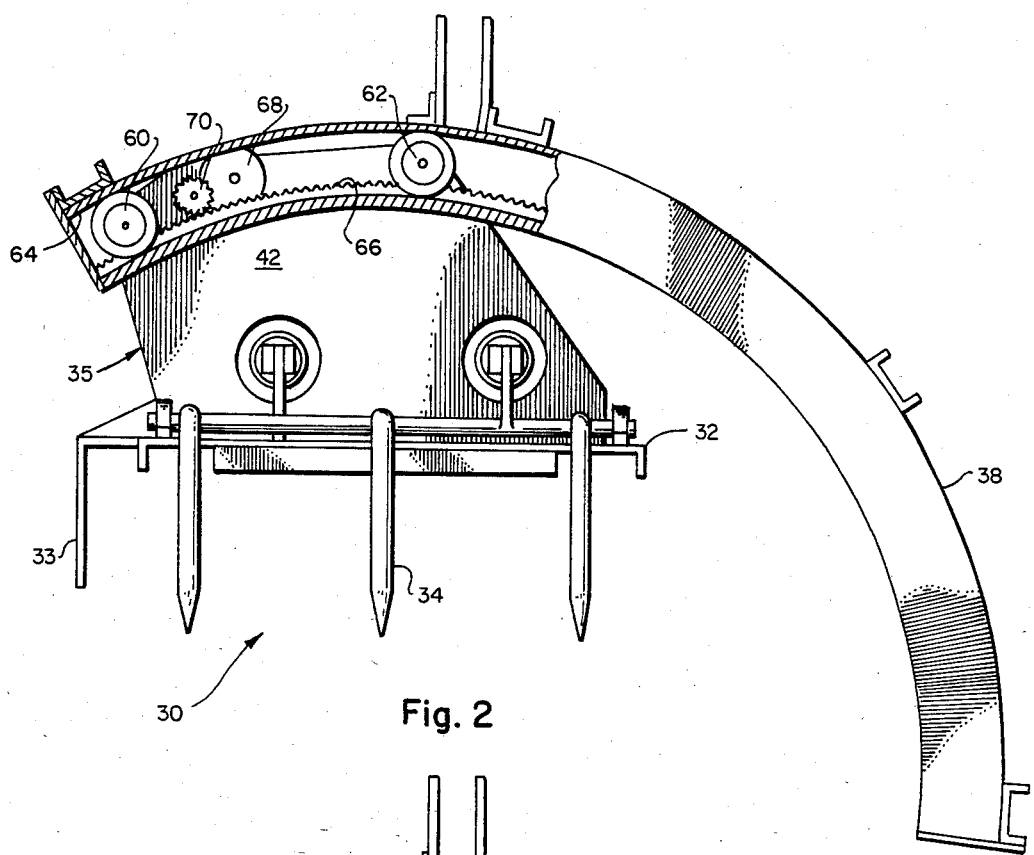
FIGS. 2 and 3 are partially broken away side views of the rotator assembly of the present invention illustrating the fork assembly in two positions of adjustment.
Figure 3:
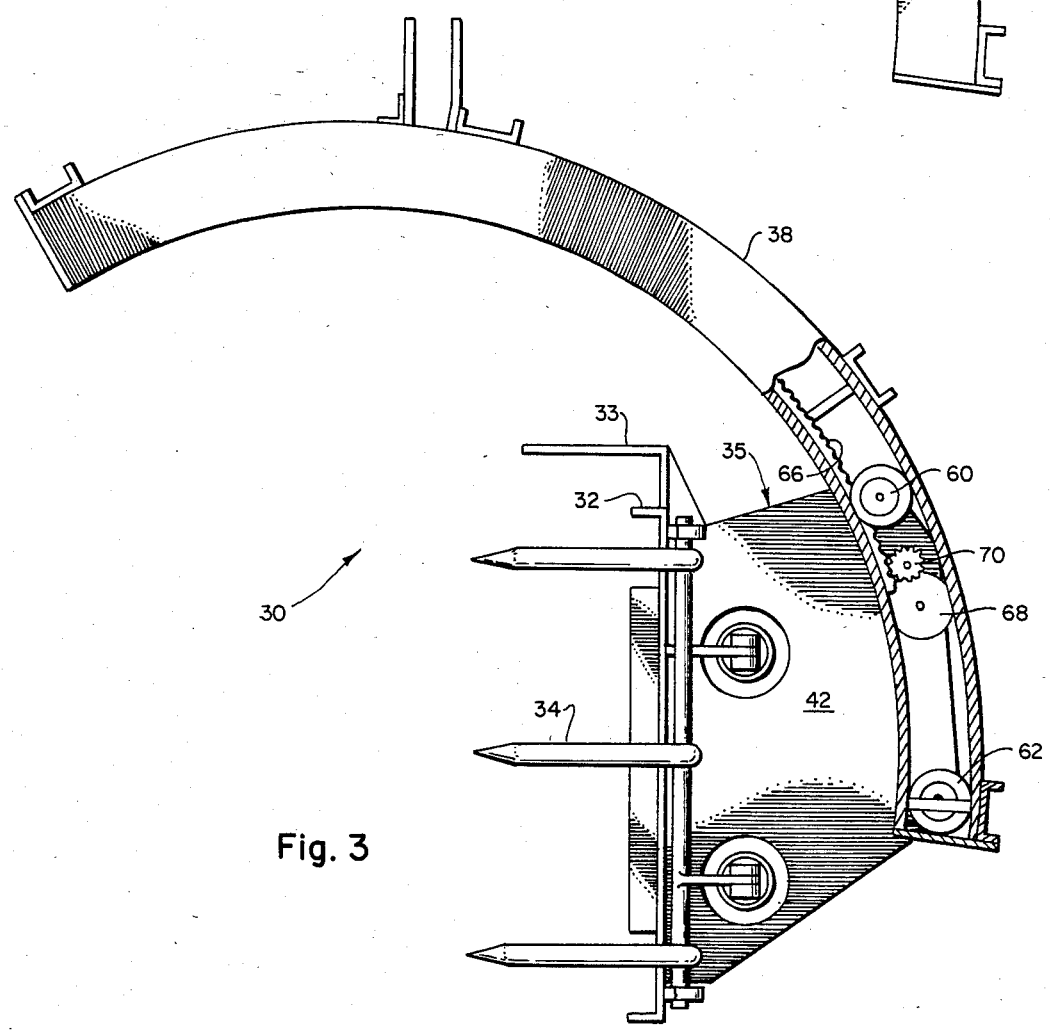

Reference is now made to FIGS. 2 and 3 which illustrate in greater detail the rotating means of fork assembly 30. The planar body 32 is designed to fit adjacent one side of a large bale. A flange 33 depends downwardly from the forward edge of body 32 to assist the operator in positioning fork assembly 30 in the center of one side of a bale. Body 32 is placed on a side of the bale and is adjusted such that flange 33 abuts an adjacent side of the bale. Forks 34 and 36 can then be inserted into the bale in the position illustrated in FIG. 4 to grasp the bale.

A sled 35 connects body 32 to tracks 38 and 39, and provides the means for rotating the bales ninety degrees about a horizontal axis. In FIG. 2, body 32 and sled 35 are shown in a first position of adjustment wherein the fork assembly 30 is aligned to grasp the top of a bale. In FIG. 3, sled 35 is shown in a second position of adjustment wherein body 32 is rotated ninety degrees from the first position of adjustment.

Sled 35 is formed from two parallel panels 42 and 44 (see FIG. 4) which extend perpendicularly outward from body 32. Panel 42 is supported in track 38 by wheels 60 and 62. As sled 35 moves between the first and second positions of adjustment, wheels 60 and 62 roll along a channel 64 formed in track 38. A tooth rack 66 is formed along a portion of the length of track 38. A gear 70 is connected to sled 35 and cooperates with tooth rack 66 to move sled 35 between the first and second positions of adjustment. Gear 70 is driven by a hydraulic motor 68.

Figure 4:
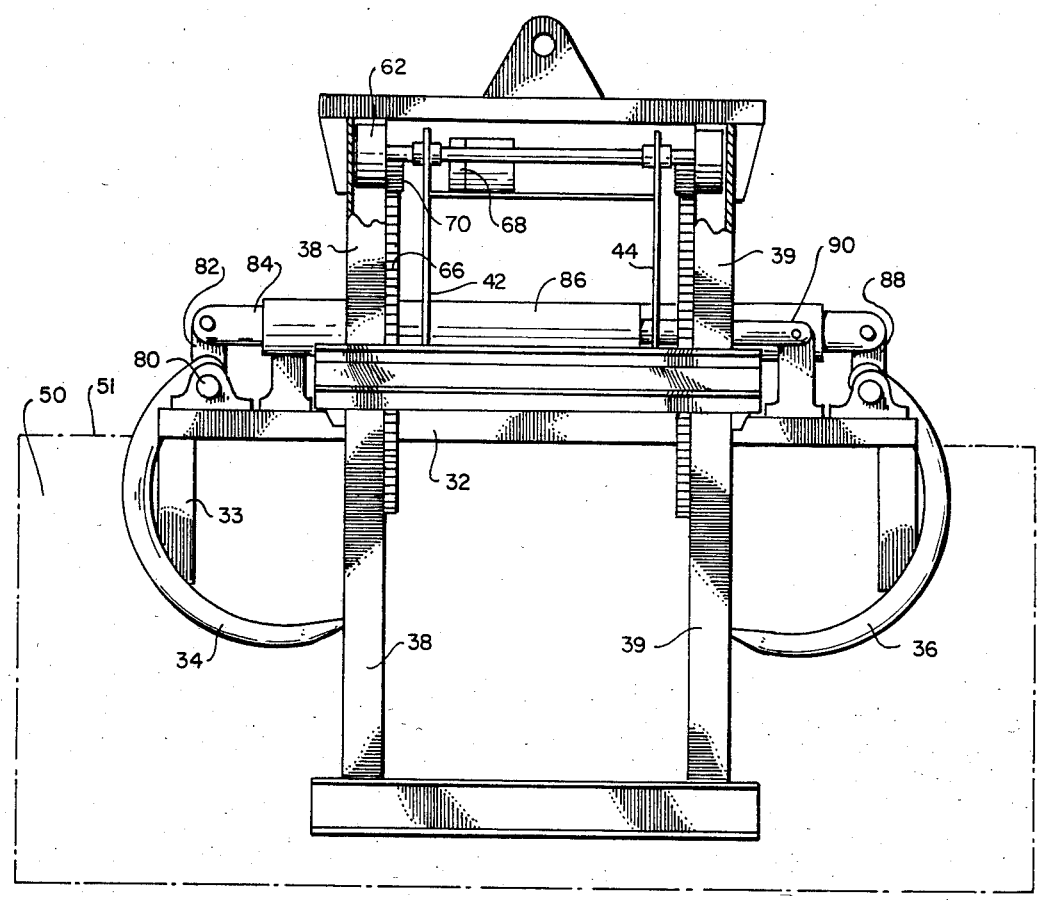
FIG. 4 is a rear view of the fork assembly and rotator assembly of the present invention.

Reference is now made to FIG. 4 to illustrate the manner whereby hooks 34 and 36 are operated to secure a bale. In FIG. 4, the outline of bale 50 is illustrated by dotted lines and hooks 34 and 36 are illustrated in the bale engaging position. Body 32 is positioned on the top surface 51 of bale 50 and hooks 34 and 36 extend down into the interior of the bale. Hooks 34 and 36 are operated between a retracted position and the bale engaging position by a pair of hydraulic pistons connected to the top of body 32.

Hooks 34 are pivotally connected to body 32 by hinge member 80. A post 82 extends upwardly from hooks 34 and is connected to the plunger bar 84 of a hydraulic piston 86. (See also FIG. 1.) Accordingly, as plunger bar 84 is withdrawn, it causes hooks 34 to pivot about hinge 80 such that the hooks are raised to the retracted position above the top 51 of bale 50. Hooks 36 operate in a similar manner. Hooks 36 are connected by means of a post 88 to the plunger 90 of a second hydraulic piston 91 which faces in the opposite direction as piston 86.

Figure 5:
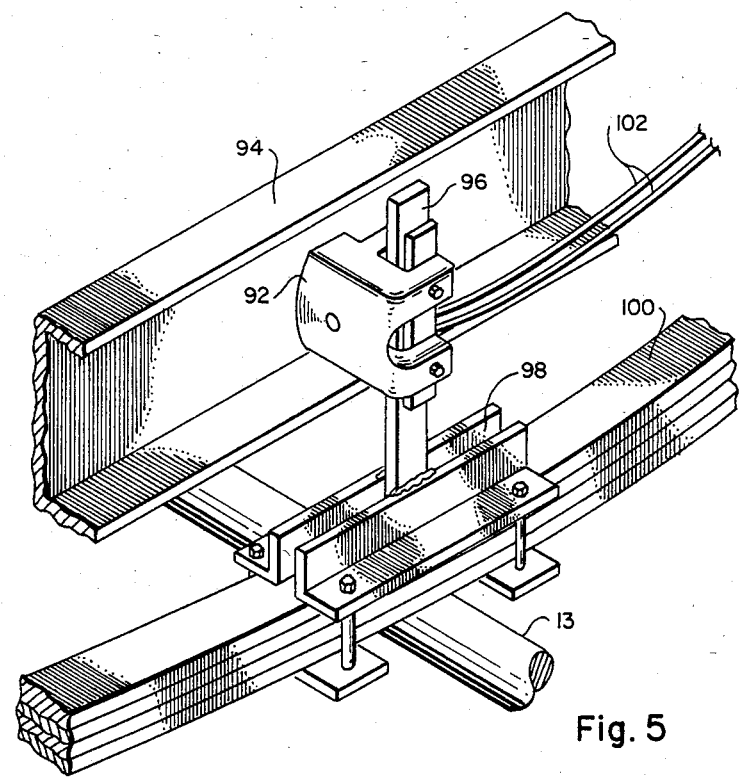
FIG. 5 is a perspective view of the suspension system locking mechanism of the present invention.

Reference is now made to FIG. 5 which illustrates the suspension locking mechanism of big bale handling system 10. While a large bale is being lifted and maneuvered into position, it is necessary to stabilize the chassis 12 to prevent handling system 10 from extreme tilting or tipping over. Prior art systems in other fields which use booms and cranes have utilized outriggers to stabilize the chassis while a load was being lifted. However, it takes time to position the outriggers. Thus, when a system is being used to load a series of bales in a field the overall operating time would be significantly increased because of having to lower and raise the outriggers for each bale. Additionally, it is possible that an operator may forget to lift the outriggers after loading a bale and start to drive on to the next bale. This could cause damage to the outriggers or the remainder of the bale handling system. In order to overcome these disadvantages, the present invention utilizes a unique system for locking the suspension to stabilize the chassis while a bale is being maneuvered.

A pair of brake calipers 92 are connected to frame 94 of chassis 12 above axle 13 (see FIG. 1). A locking bar 96 is slidably positioned within calipers 92 such that it can move up and down with the normal movement of the suspension. The lower end of locking bar 96 is secured to a bracket 98 which encompasses spring 100 directly above axle 13. Accordingly, when calipers 92 are activated such that they grip bar 96, frame 94 of chassis 12 and axle 13 are held in a fixed relationship. Thus, loading system 10 can be held in a stable position while a large bale is being lifted and maneuvered. By simply releasing calipers 92, the locking system is released and the suspension system can again operate normally. Calipers 92 can be connected by a series of hydraulic lines 102 to a cylinder-pedal assembly or other convenient operating means in cab 14.

In order to load and transport bales, an operator drives system 10 into the field and positions the system alongside a bale. Because of the rotator head 40 on the boom, it is not necessary to position system 10 exactly parallel to the bale.

The operator may then pivot seat 16 such that he can operate control panel 18 and observe the movement of boom 20. System 10 can include dual driving controls which allow the operator to utilize either a forward facing operator position or a sideways facing operator position. Thus, the operator does not have to repeatedly turn his seat as he drives between bales. After the suspension locking mechanism has been activated, the operator maneuvers boom 20 such that body 32 of fork assembly 30 is centered on the top of the bale which is to be loaded. Pistons 86 and 91 are then activated to cause hooks 34 and 36 to penetrate the bale.

Boom 20 is then maneuvered to lift the bale and place it on tilt table 52. The operation of boom 20 to place the bales on table 52 can either be performed manually or system 10 can include automatic controls to position the bales in predetermined locations on table 52. Automatic controls allow the operator to prepare to drive to the next bale while the boom finishes loading the bale it has picked up.

If it is necessary to rotate a bale so that the stalks are properly aligned for stacking to protect the hay from the weather, motor 68 can be activated to cause sled 35 to move along tracks 38 and 39 to the second position of adjustment illustrated in FIG. 3. Likewise, motor 68 can be activated to rotate a 38×46 inch Freeman bale to obtain a loading pattern which provides the greatest capacity on table 52 of system 10 as well as on a truck.

After the bale is loaded onto table 52, the operator drives system 10 around the field to load additional bales. When table 52 is loaded to capacity the suspension locking mechanism is released, and system 10 can be driven to the stack lot where table 52 can be raised to unload the hay. Alternatively, boom 20 and fork assembly 30 can be used to individually unload the bales of hay and stack them or transfer the bales to another truck for hauling.

As can be seen from the foregoing, the present invention provides a unique big bale handling system which is easy to operate such that a single operator can load and transport big bales of hay or other crops. This system also provides a means for aligning the bales such that they are in the proper orientation for stacking so as to be protected from the weather. Additionally, the unique suspension locking mechanism provides a simple means for stabilizing the chassis while a bale is being loaded.

It should be further appreciated that while the present invention has been particularly described in reference to the presently preferred embodiment, the invention may be embodied in other specific forms without departing from its spirit or essential characteristics. Thus, the described embodiment is to be considered in all respects only as illustrative and not restrictive. The scope of the invention is, therefore, indicated by the appended claims rather than by the foregoing description. All modifications or changes which come within the meaning and range of equivalency of the claims are to be embraced within their scope.

What is claimed and desired to be secured by United States Letters Patent is:

1. An apparatus for handling and transporting large bales of crops, said apparatus comprising:
   a motorized chassis having operator control means whereby a single operator can manipulate said apparatus, said chassis further comprising a table onto which bales can be stacked;
   boom means anchored to said chassis for lifting and maneuvering the bales;
   fork means positioned on a distal end of said boom means for grabbing the bales and holding them while they are maneuvered, wherein said fork means comprises a first and second pair of curved hooks which penetrate a first side of a bale from opposing directions;
   rotator means positioned on the distal end of said boom and connected to said fork means, said rotator means comprising first means for rotating said fork means about a substantially vertical axis, and second means for rotating said fork means about a substantially horizontal axis such that said bales of crops may be rotated and stacked on a selected side thereof wherein said second means for rotating said fork means about a substantially horizontal axis comprises a curved track and a sled, said sled being translatable along said track from a first position of adjustment to a second position of adjustment; and
   suspension locking means secured to said chassis for stabilizing said chassis while a bale is being handled.

2. An apparatus for handling and transporting large bales of crops such as hay, said apparatus comprising:
   a motorized chassis having operator control means whereby a single operator can control said apparatus, said chassis further comprising a table onto which bales of hay can be stacked;
   a boom anchored to said chassis for lifting and maneuvering the bales;
   a fork means positioned on the distal end of said boom for grabbing and holding the bales such that they can be maneuvered, said fork means comprising a body, a first set of hooks on a first side of said body, and a second set of hooks on a second side of said body, said first and second sets of hooks being capable of penetrating a first side of a bale;
   means positioned on the distal end of said boom adjacent said fork means for rotating the bales about a horizontal and a vertical axis such that the bales can be aligned in a predetermined orientation for stacking, said means for rotating said bales about a horizontal axis comprising a curved track and a sled, said sled being translatable along said track from a first position of adjustment to a second position of adjustment; and
   suspension locking means secured to said chassis for stabilizing the chassis while a bale is being hanled.

3. A system for handling and transporting large bales of crops, said system comprising;
   a motorized chassis having operator control means whereby a single operator can control said system, said chassis further having table means onto which bales can be loaded;
   boom means connected to said chassis for lifting and maneuvering the bales;
   fork means positioned on a distal end of said boom means for grabbing the bales and holding them while they are maneuvered; and
   rotator means positioned on the distal end of said boom and connected to said fork means, said rotator means comprising first means for rotating said fork means about a substantially vertical axis, and second means for rotating said fork means about a substantially horizontal axis such that said bales of crops may be rotated and stacked on a selected side thereof, said second means for rotating said fork means about a substantially horizontal axis comprising a curved track and a sled, said sled being translatable along said track from a first position of adjustment to a second position of adjustment.

4. A system for handling and transporting large bales of crops as defined in claim 3 wherein said table comprises a bed which can be tilted ninety degrees to unload bales stacked thereon.

5. A system for handling and transporting large bales of crops as defined in claim 3 wherein said fork means comprises a first and a second set of hooks which penetrate a first side of a bale.

6. A system for handling and transporting large bales of crops as defined in claim 3 wherein said system further comprises a suspension locking means secured to said chassis for stabilizing said chassis while a bale is being handled.

7. A system for handling and transporting large bales of crops as defined in claim 6 wherein said suspension locking means comprises a pair of hydraulic calipers secured to a portion of a frame of said chassis and a locking bar which slidably engages said calipers, said locking bar being secured to an axle of said chassis.

* * * * *

UNITED STATES PATENT AND TRADEMARK OFFICE
CERTIFICATE OF CORRECTION

PATENT NO. : 4,552,501

DATED : November 12, 1985

INVENTOR(S) : Raymond W. Clark et al.

It is certified that error appears in the above-identified patent and that said Letters Patent is hereby corrected as shown below:

Title page:

Abstract, line 9, "mechanism" should be --a mechanism--
Column 2, line 22, "weights" should be --weighs--
Column 1, line 37, "comprised" should be --comprise--

Signed and Sealed this

Eleventh Day of March 1986

[SEAL]

Attest:

DONALD J. QUIGG

Attesting Officer

Commissioner of Patents and Trademarks